June 10, 1958     M. P. WINTHER     2,838,702
ELECTROMAGNETIC COUPLING DEVICE

Filed Dec. 8, 1955     3 Sheets-Sheet 1

Martin P. Winther,
Inventor.
Koenig and Pope
Attorneys.

June 10, 1958  M. P. WINTHER  2,838,702
ELECTROMAGNETIC COUPLING DEVICE
Filed Dec. 8, 1955  3 Sheets-Sheet 2

Martin P. Winther
Inventor.
Koenig and Pope
Attorneys.

June 10, 1958  M. P. WINTHER  2,838,702
ELECTROMAGNETIC COUPLING DEVICE
Filed Dec. 8, 1955  3 Sheets-Sheet 3

United States Patent Office 2,838,702
Patented June 10, 1958

2,838,702

ELECTROMAGNETIC COUPLING DEVICE

Martin P. Winther, Gates Mills, Ohio, assignor to Eaton Manufacturing Company, Cleveland, Ohio, a corporation of Ohio Application December 8, 1955, Serial No. 551,804

5 Claims. (Cl. 310—105)

This invention relates to electromagnetic coupling devices and, with regard to certain more specific features, to such devices for constructing couplings, brakes, dynamometers and the like, hereinafter referred to broadly as couplings.

Among the several objects of the invention may be noted the provision of a liquid-cooled electromagnetic coupling of simple form which is safe in hazardous locations, and which requires little maintenance, being an improvement upon the structure shown in the U. S. patent application of Anthony Winther Serial No. 451,109, filed August 20, 1954, for Stationary Field Coupling; and the provision of apparatus of the class described having a small number of parasitic magnetic gaps, these being advantageously located so as to be subject only to small magnetic leakage. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a lower-half axial section of an eddy-current coupling embodying one form of the invention, the section being taken on line 1—1 of Fig. 2;

Figure 1:
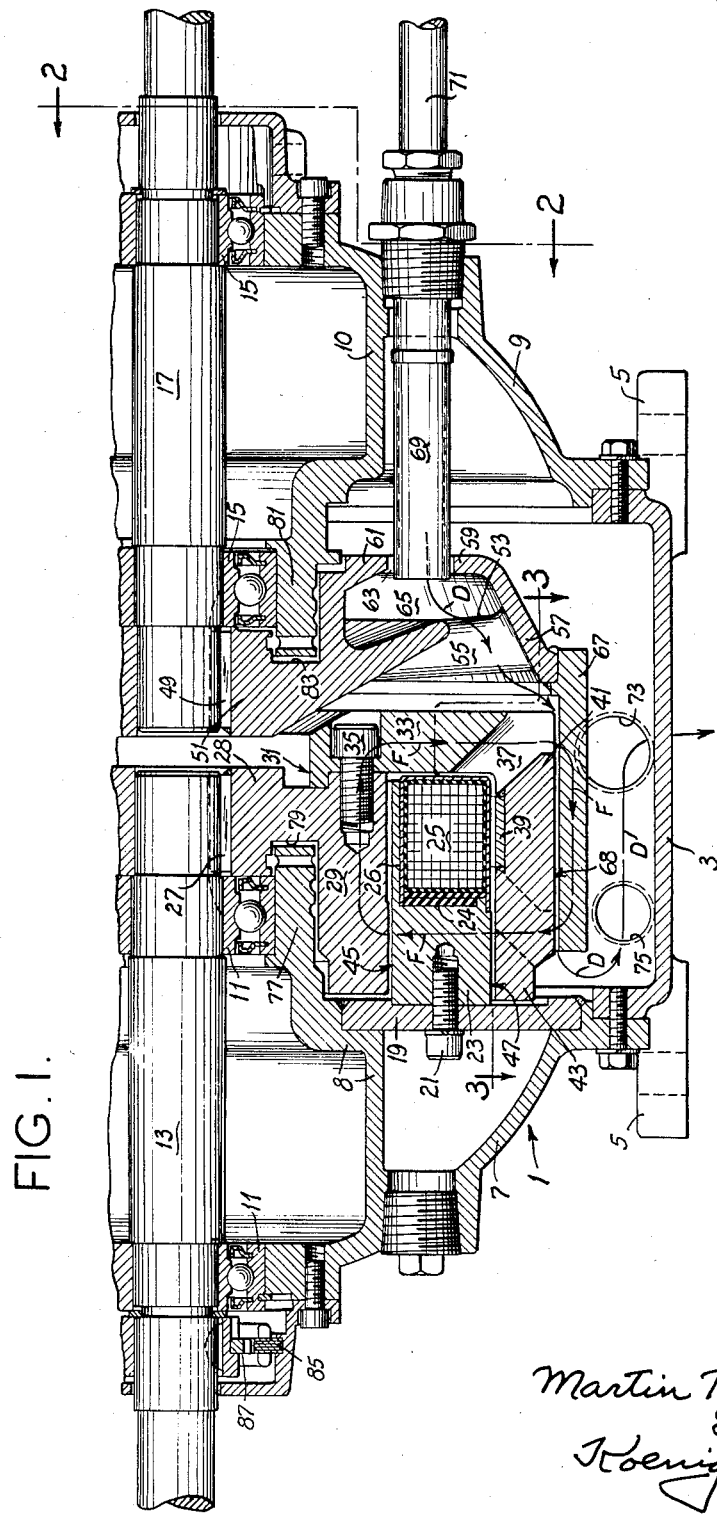
Figure 2:
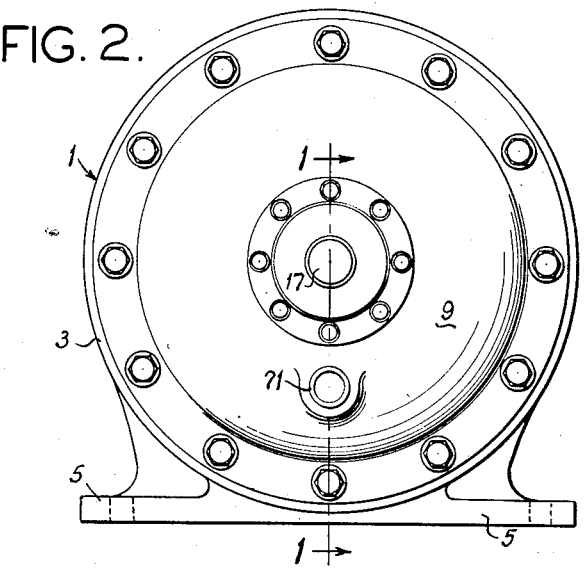
Fig. 2 is a right-end elevation, being viewed on line 2—2 of Fig. 1.
Figure 3:
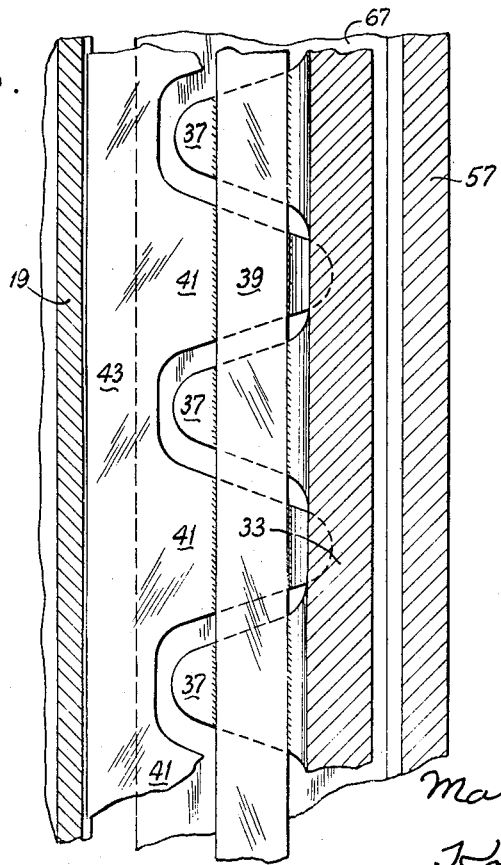
Fig. 3 is a fragmentary flat-developed view across line 3—3 of Fig. 1 of a certain polar tooth arrangement employed in the form of the invention shown in said Fig 1; and, Fig. 4 is a view similar to Fig. 1 but showing an alternative embodiment of the invention.

Referring now more particularly to Fig. 1, there is shown in general at numeral 1 a stationary housing assembly consisting of a central sleeve 3 having supports 5 and end bells 7 and 9. Bearings 11 located in a sleeve 8 of end bell 7 carry a driven shaft 13. Bearings 15 in a sleeve 10 of end bell 9 carry a drive shaft 17. Under some circumstances, the driving and driven relationship between shafts 13 and 17 may be reversed. A non-magnetic ring 19 is affixed as by welding to the inside of the end bell 7. By means of bolts 21 this ring 19 holds a stationary magnetizable (iron, for example) ring 23. This ring is right-angularly recessed at 24 for receiving and supporting an annularly wound toroidal field coil 25. This coil is protected against deterioration by encasement in a copper container 26 infilled with a protective epoxy resin.

Keyed to the driven shaft 13 as at 27 is a hub 28 of an inner magnetizable axial sleeve 29, forming part of a magnetizable field member indexed in general as 31. A second and radial part of this field member 31 is constituted by a magnetizable ring 33 held to the sleeve 29 by bolts 35 Extending axially from the ring 33 are spaced integral magnetizable polar teeth 37 on the insides of which are welded a nonmagnetic (copper, for example) ring 39. At numerals 41 are shown spaced magnetizable polar teeth which spacedly interdigitate with the teeth 37 and are rigidly supported in respect thereto. This is accomplished by a welded attachment with said nonmagnetic ring 39. The roots of the teeth 41 are formed integrally with an annular magnetizable ring portion 43. Thus in cross section the assembly of parts 29, 33, 37, 39, 41 and 43 makes up a C-shape for accepting the sectionally rectangular assembly of ring 23 and coil 25. The inner leg portion of the C-shape is magnetically continuous, whereas the outer leg portion is constituted by the assembly of interdigitated magnetically isolated groups of polar teeth 37 and 41. The magnetizable ring 43 joins all polar teeth 41, whereas the magnetizable ring 33 joins all polar teeth 37. The interdigitated teeth 37, 41 are out of direct magnetic contact because the ring 39 which mechanically joins them is nonmagnetic. The result is that on one side of the coil there is a pair of magnetic gaps 45 and 47 between members 29, 23 and 23, 43, respectively, the radial dimensions of which are kept to a minimum as, for example, .015 inch to .028 inch or so. The inner and outer faces of each gap 45 and 47 are cylindric. The gaps are in a radial plane on one side of the coil 25.

Keyed as at 49 to the drive shaft 17 is a spider formed by a hub 51 having spokes 53 between which are water-conducting openings 55. The spokes terminate in a solid conical ring 57 inwardly flanged as shown at 59. The hub 51 is also outwardly flanged as shown at 61, thus forming with flange 59 an annular slot 63 leading into an annular pocket 65. Welded to the outside of ring 57 is a magnetizable inductor drum 67, the inner surface of which is machined as a smooth cylinder. The outsides of the interdigitated teeth 37 and 41 of field assembly 31 are also cylindrically machined to provide a magnetic gap 68 between the teeth and the drum on the order of 0.2 inch.

Plugged into the end bell 9 is a liquid coolant (water) inlet 69, the inner end of which terminates within the slot 63. Water is fed to inlet 69 through a supply pipe 71, whereupon it flows through passages 65, 55, gap 68 and into the lower part of the housing assembly 1, as indicated by the streamline darts D. Escape is through an outlet port 73. At 75 is a location for a suitable thermostatic control to be operatively connected with a water-control valve (not shown) in pipe 71. Centrifugal force due to rotation assures that the water will be spread throughout the gap 68 as it flows therethrough. The amount of water is preferably restricted to the provision of a thin film so as to minimize hydraulic drag.

Labyrinth seals are provided between the stationary and rotating parts as follows: Sleeve 8 is extended as shown at 77 into a recess 79 in hub 28; and sleeve 10 is extended as shown at 81 into a recess 83 in hub 28.

On the outside of end bell 7 is attached the stator 85 of a small control generator, the rotor 87 of which is attached to the driven shaft 13. This generator supplies a response to variations in speed of shaft 13 for effecting control of excitation of the coil 25, as is known in the art. Thus with a constant speed of drive shaft 17, the speed of shaft 13 may be regulated through a suitable control circuit connecting the generator 85, 87 into the supply circuit for coil 25.

Operation is as follows, assuming that the drive shaft 17 is being driven at, say, a substantially constant speed by a motor or the like, and that the coil 25 is suitably excited:

Excitation of coil 25 results in a toroidal flux field, one of the lines of force of which is shown by dash lines F. It will be understood that there are additional flux lines in the flux loop. The flux loop has an interlinkage as follows: sleeve 29, ring 33, polar teeth 37, inductor drum 67 (after having crossed the gap 68), polar teeth 41 (again after having crossed the polar gap 68 in the reverse direction), ring 43, gap 47, ring 23, gap 45 and back to the sleeve 29. This order may be reversed, depending upon the direction in which the exciting current flows through the loops of coil 25.

The resulting relative sweep of concentrated flux from the polar teeth 37 and 41 results in the generation of eddy currents in the drum 67. These eddy currents in turn generate a flux field which is reactive with the concentrated polar fields from the teeth, so that a slip coupling effect is obtained between driving and driven shafts 17 and 13, respectively. The amount of rotary slip is an inverse function of the excitation of coil 25. The speed of the driven shaft 13 controls the output of the generator 85, 87, which is caused to have its effect on the excitation circuit for coil 25, thus providing, if desired, a constant speed of driven shaft 13, which will be lower than that of drive shaft 17.

Since, as stated, the sweep of the polar fields from teeth 37 and 41 in the inductor drum 67 generates eddy currents, heating of the drum results and it is the purpose of the flow of coolant to carry away this heat. The resulting efficient cooling reduces the coupling size for a given driving capacity in terms of torque transmitted.

Figure 4:
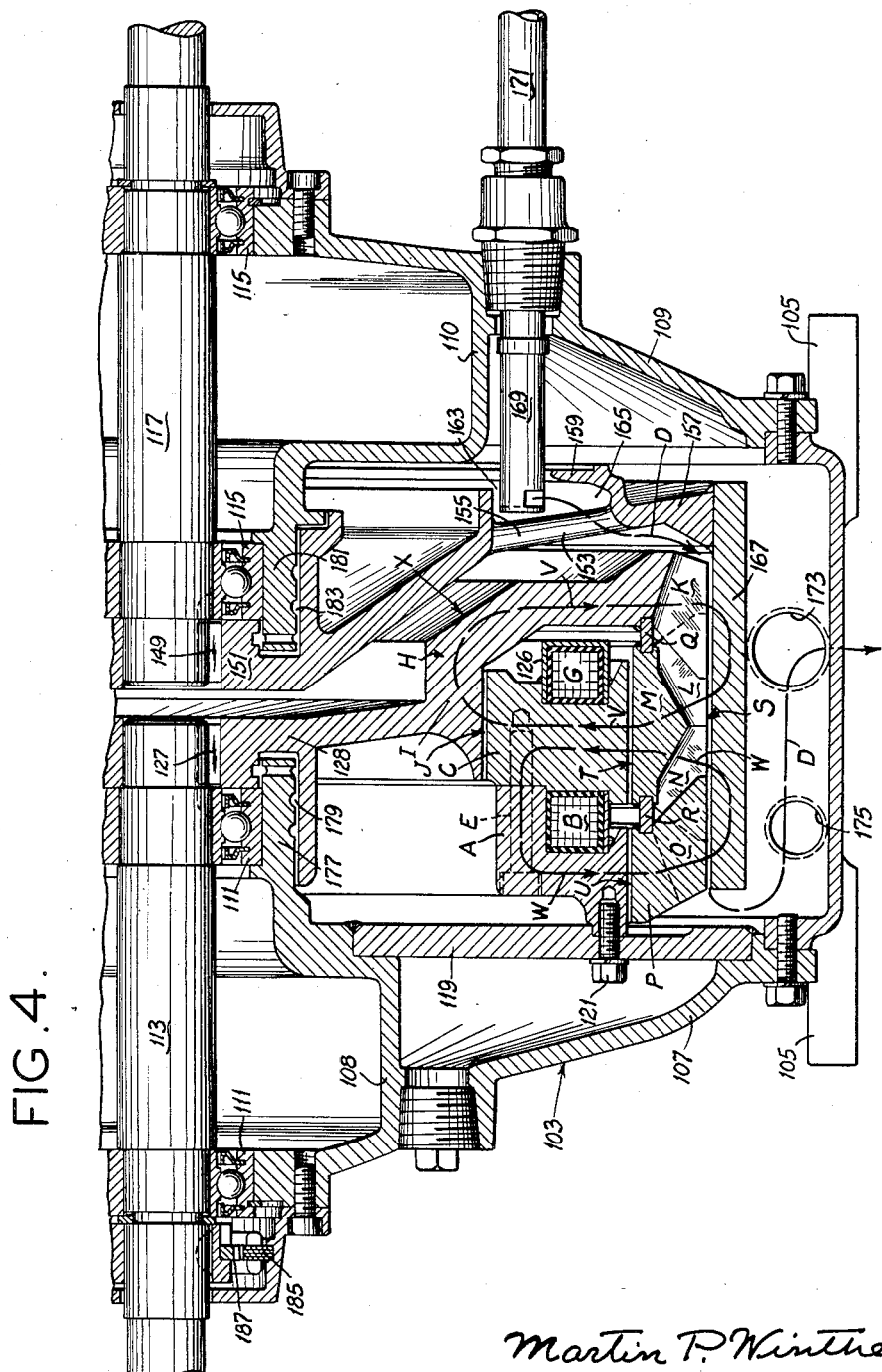

In Fig. 4 is shown an alternative form of the invention in which those parts that are similar and analogous in function to those already described have been given index characters which are one hundred units higher than the index characters for analogous parts in Fig. 1. They will therefore require no repetitive description. The additional description below in connection with Fig. 4 will be restricted to important points of difference. Thus (Fig. 4) the stationary ring 119 has fastened thereto by means of the bolts 121 a magnetizable ring component A carrying an annular field coil B. Another magnetizable ring component C is held to ring A by means of studs E. Ring C carries an annular field coil G. Thus the field assembly A, B, C, G is stationary. Rings C and A may be called first and second rings, respectively.

In this case the hub 123 carries a magnetizable member H interiorly formed as a sleeve I having a cylindric interior surrounding the cylindric exterior of the ring C with a magnetic gap J therebetween (similar to gap 45 in Fig. 1). The member H extends radially adjacent coil G and is formed at its outer periphery with axially directed spaced polar teeth K. These interdigitate with axially directed spaced polar teeth L of an intermediate magnitizable sleeve or ring M. The sleeve M has additional axially directed spaced polar teeth N which interdigitate with axially directed spaced polar teeth O extending from a continuous magnetizable ring P. A nonmagnetic ring Q welded to member H and sleeve M hold them in assembled interdigitated relation between their poles L and K while at the same time keeping them magnetically separate. Likewise, a nonmagnetic ring R welded to sleeve M and ring P holds them in assembled interdigitated relation between their poles N and O, while at the same time keeping them magnetically separate. A cylindric magnetic gap S is established between drum 167 and the outsides of the polar teeth K, L, N, O, which are externally cylindrically machined for that purpose. Gap S is the counterpart of gap 68 in Fig. 1. A magnetic gap T is established between the inside of the intermediate sleeve M and the outside of ring C, and a magnetic gap U is also established between the inside of the ring P and the outside of the ring A. Gaps T and U are like the gap 47 in Fig. 1. Gaps J and T are substantially in a radial plane located between coils B and G. Rings M and P may be called third and fourth rings, respectively.

Assuming that the coils B and G are wired into a circuit, so that the current directions in them are opposite, toroidal magnetic loops exemplified by the dash lines V and W will surround the coils G and B, respectively, with their interlinkages as shown. Thus loop V passes through member H, teeth K, drum 167 (having crossed gap S), teeth L (again having crossed gap S), ring M and ring C (via gap T), returning to member H (via gap J). Loop W passes from ring A to ring P (via gap U), polar teeth O to drum 167 (via gap S), then to teeth N (again via gap S), intermediate sleeve M, ring C (via gap T) and back to ring A. As will be observed from Fig. 4, the cross section of the magnetic path extending between coils B and G is made larger than the paths extending outside of these coils. This is to accommodate the sum of the fluxes from the coils in this intermediate region. The operation of this Fig. 4 form of the invention is similar to that already described in connection with Fig. 1, a difference being that there are four rings of driving flux concentrations moving around the inside of the drum 167, instead of two rings of driving flux concentration such as move around the inside of the drum 67 in Fig. 1. This increases the torque-transmitting capacity. It will be understood that there is no braking torque applied across any of the gaps 45, 47 (Fig. 1) or gaps J, T, U (Fig. 4) because there are no traveling flux concentrations in these. Neither do these gaps heat unduly, for the same reason.

An advantage of the invention over that shown in said Anthony Winther application Serial No. 451,109, insofar as the fixed coils B, G and 25 are concerned, is that a more compact, cool-running arrangement is afforded for a given capacity. This is because at least one pair of non-torque-transmitting gaps (such as 45 and 47 in Fig. 1; and J and T in Fig. 4) has its members in a common plane located on one side of the respective coil that is served (coil 25 in Fig. 1; and coil G in Fig. 4). In other words, these pairs of gaps are in radial alignment, rather than in axial alignment as in Serial No. 451,109. This minimizes leakage flux particularly such as might otherwise reach shafts 13 and 17. The structure which is responsible for this favorable arrangement is the C-shaped radial section of the field assembly 31 around coil 25 in Fig. 1, and the generally C-shaped radial section of the assembly indexed X in Fig. 4 and constituted by members H, M, P, and the subassembly of polar teeth K, L, M, O.

Regarding the liquid cooling arrangement, it carries off heat at a more rapid rate than this would be accomplished by air cooling in the same size of machine. In this connection it will be noted that the spaced teeth 37 and 41 or K, L, N, O act as fluid-spreading paddles encouraging an even distribution of coolant film on the inside surface of the outer inductor drum.

The nonmagnetic character of rings 19 and 119 avoids magnetic attraction on rings 29, 37 or P. Thus bearings 11 or 111 are not required to take end thrust from this source.

While the invention has been described in relation to couplings in which both the driving and driven members rotate, it is applicable to brakes, dynamometers and the like, since the latter types of machines are in effect couplings wherein the driven elements are held stationary with relative movement occurring between them and the driving elements during deceleration or braking action. The word coupling is to be construed as including any of the three stated types of machines enumerated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. An electromagnetic coupling device comprising relatively rotatable coaxial driving and driven members, a fixed magnetizable ring, an annular coil affixed adjacent one end portion of the ring, inner and outer concentric cylindric portions forming the other end portion of said ring, a magnetizable assembly affixed to one of said members and being rotatable therewith, said assembly having a sleeve extending transversely of the coil and an extension providing a cylindric portion forming a first and inner magnetic gap with the adjacent inner cylindric portion of said other end portion of said fixed ring, said assembly having a magnetizable portion adjacent the coil at its end opposite said fixed ring and extending radially, said assembly also having an axial portion extending from said radial portion transversely of the coil and fixed ring, said axial portion comprising a continuous movable ring adjacent the outer cylindric portion of said other end portion of said fixed ring and providing a second and outer magnetic gap therewith, said axial portion also comprising first and second sets of spaced peripherally interdigitated polar teeth extending axially between said movable ring and said radial portion, said first set of teeth being supported by said radially extending portion of said assembly, nonmagnetic means attached to both sets of interdigitated teeth and supporting the second set of teeth and said movable ring on the first set of teeth, and an inductor drum carried by a supporting spider on and rotary with the other member, said drum extending transversely across said interdigitated teeth and having a cylindric portion forming an exterior magnetic gap therewith.

2. Apparatus made according to claim 1, wherein said drum is open-ended at a point adjacent said movable ring, and wherein said spider has a circular inlet slot, and means adapted to inject coolant through said slot into the drum adjacent said radial portion of said assembly, said coolant being movable centrifugally against the inside of the drum by rotation of the drum and action of said interdigitated teeth whereby the coolant moves along the inside of the drum and exits from its open end adjacent said movable ring.

3. An electromagnetic coupling device comprising relatively rotatable coaxial driving and driven members, a fixed magnetizable ring, an annular field coil affixed adjacent one end portion of the ring, inner and outer concentric cylinders forming the other end portion of said ring, a magnetizable assembly affixed to one of said members and being rotatable therewith, said assembly having an inner sleeve passing through the coil and having an extension providing a cylindric portion forming a first magnetic gap with respect to the inner cylindric portion of said ring, said assembly having a magnetizable radial portion adjacent the coil at its end which is opposite said fixed ring and extending radially from said inner sleeve, said assembly also having an axial portion extending from said radial portion and exteriorly enveloping the coil and fixed ring, said axial portion including a continuous movable ring adjacent the outside of the fixed ring and providing a second magnetic gap therewith, said axial portion comprising sets of spaced peripherally interdigitated polar teeth extending from said outside fixed ring and radial portion respectively, and an inductor drum carried by and rotary with the other rotatable member, said drum surrounding said interdigitated teeth and having an inside cylindric portion forming therewith a third magnetic gap extending across and in the plane of and surrounding the coil.

4. An electromagnetic coupling device comprising relatively rotatable coaxial driving and driven members, a first fixed magnetizable ring portion, a first annular coil affixed adjacent one end of said first ring portion, inner and outer concentric cylinders forming the other end of the first ring portion, a magnetizable assembly affixed to one of said members and being rotatable therewith, said assembly having a sleeve extending transversely of the first coil and an extension from the sleeve providing a cylindric portion forming a first magnetic gap with an adjacent cylindric portion of said first ring portion, said assembly having a magnetizable radial portion adjacent the first coil at its end opposite said first ring portion, a second annular coil separated from the first coil by the part of the first ring portion which has said inner and outer concentric cylinders, a second magnetizable ring portion having a part located transversely of the second coil, a radial portion and an axially extending cylindric portion, said assembly having axial portions extending from said radial portions thereof and transversely of both coils, said axial portions of the assembly including third and fourth movable rings adjacent the fixed first ring portion and second ring portion respectively and providing magnetic gaps therewith, said axial portions of the assembly also having peripheral rows of interdigitated polar teeth respectively connected to the third and fourth rings and also to the third ring and the radial portion of said assembly, and an inductor drum carried by and rotary with said other member, said inductor drum extending transversely across both rows of interdigitated teeth and having a cylindric portion forming a magnetic gap therewith.

5. An electromagnetic coupling device comprising relatively rotatable coaxial driving and driven shafts, a first fixed magnetizable ring portion, a first annular coil affixed adjacent one end of said first ring portion, inner and outer concentric cylinders forming the other end of the first ring portion, a magnetizable assembly affixed to one of said shafts and being rotatable therewith, said assembly having a sleeve extending transversely and inside of the first coil and an extension from the sleeve providing a cylindric portion forming a first magnetic gap with the adjacent inner cylindric portion of said first ring portion, said assembly having a magnetizable radial portion adjacent the first coil at its end opposite said first ring portion, a second annular coil separated from the first coil by the part of the first ring portion which has said inner and outer concentric cylinders, a second fixed magnetizable ring having a portion located transversely inside of the second coil and a radial portion connecting with an axially extending outer cylindric portion, said assembly having axial portions extending from its radial portion transversely and outside of both coils, said axial portions of the assembly including third and fourth movable rings adjacent the first and second ring portions respectively and providing magnetic gaps therewith, said axial portions of the assembly having peripheral bands of interdigitated polar teeth respectively connected to the third and fourth rings and also to the third ring and the radial portion of the assembly, and an inductor drum carried by and rotary with said other shaft, said inductor drum extending transversely across the outsides of said interdigitated teeth and having a cylindric portion forming a magnetic gap therewith.

References Cited in the file of this patent

UNITED STATES PATENTS

| 1,702,755 | Weydell | Feb. 19, 1929 |
| 2,701,315 | Winther | Feb. 1, 1955 |

UNITED STATES PATENT OFFICE

CERTIFICATE OF CORRECTION

Patent No. 2,838,702                      June 10, 1958

Martin P. Winther

It is hereby certified that error appears in the printed specification of the above numbered patent requiring correction and that the said Letters Patent should read as corrected below.

Column 2, line 42, for "0.2 inch" read -- .02 inch --.

Signed and sealed this 19th day of August 1958.

(SEAL)
Attest:
KARL H. AXLINE
Attesting Officer

ROBERT C. WATSON
Commissioner of Patents